United States Patent [19]

Gallant

[11] 4,083,235

[45] Apr. 11, 1978

[54] COMPRESSOR STALL WARNING SYSTEM

[75] Inventor: Richard Paul Gallant, Leonardtown, Md.

[73] Assignee: The United States of America as represented by the Secretary of the Navy, Washington, D.C.

[21] Appl. No.: 800,589

[22] Filed: May 25, 1977

[51] Int. Cl.² ........................................... G01M 15/00
[52] U.S. Cl. .................................................. 73/117.3
[58] Field of Search ....................... 73/116, 117.3, 346

[56] References Cited
U.S. PATENT DOCUMENTS

| | | | |
|---|---|---|---|
| 3,426,322 | 2/1969 | Balo | 73/116 X |
| 3,872,292 | 3/1975 | Dawson, Jr. | 73/116 X |

*Primary Examiner*—Jerry W. Myracle
*Attorney, Agent, or Firm*—R. S. Sciascia; R. Beers; Sol Sheinbein

[57] ABSTRACT

A compressor stall warning system for jet aircraft gas turbine engines. The turbine inlet temperature and the compressor rotor speed are monitored and signals representative of the ratio of these two functions and the inlet temperature itself are produced. If the turbine inlet temperature increases while the compressor rotor speed decreases their ratio would increase rapidly. When either this ratio or the turbine inlet temperature alone increase beyond predetermined thresholds, a signal is furnished to the aircraft pilot warning him of impending aircraft engine stall.

4 Claims, 1 Drawing Figure

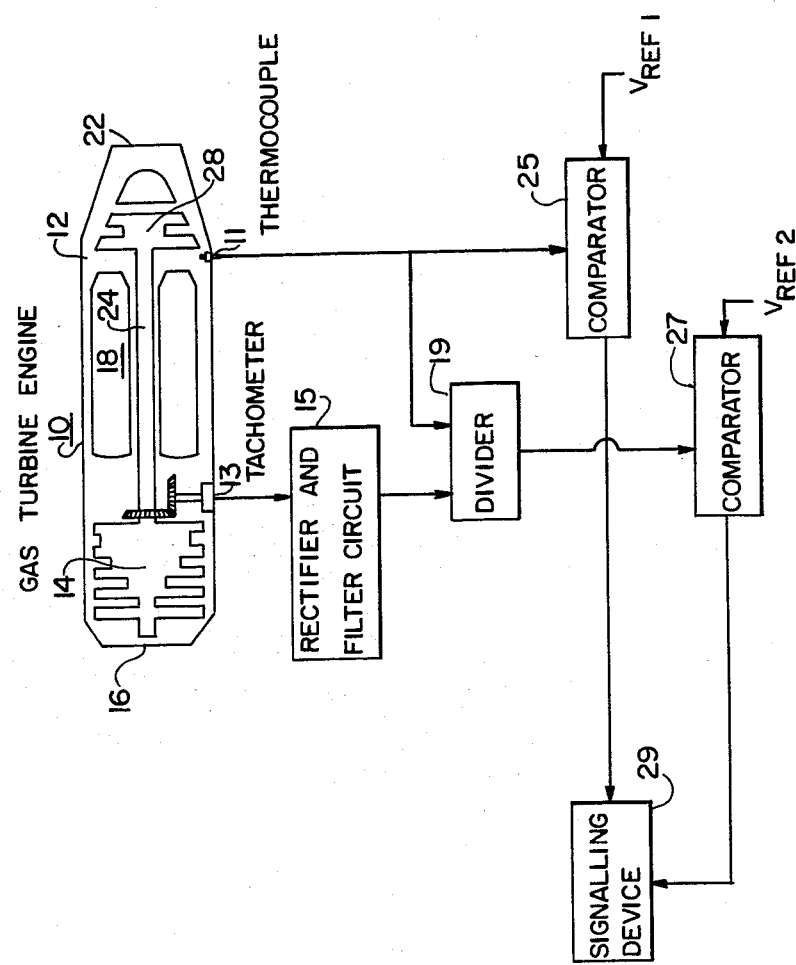

COMPRESSOR STALL WARNING SYSTEM

BACKGROUND OF THE INVENTION

The present invention relates to gas turbine engine control systems and more particularly to stall warning systems for such engines.

The phenomenon of compressor stall has become an important limiting factor in the operation of gas turbine engines as their performance characteristics have improved. In modern gas turbine engines, upon acceleration or under high altitude and low airspeed flight conditions, unstable flow may develop in the compressor which can lead to an increase in exhaust gas temperature and mechanical vibration along with a simultaneous reduction in cooling air supplied to the turbine wheel. These conditions describe "compressor stall" and can lead to turbine wheel failure if the compressor stall is not recognized and corrective action not taken. Turbine wheel failure during engine operation can lead to severe engine and aircraft damage.

To avoid such damage, control systems have been proposed to detect compressor stall and either signal the aircraft pilot or automatically compensate so as to prevent further stall. It has been found that functions of certain engine operating parameters can provide an indication of incipient stall conditions. Systems have been designed which by monitoring these parameters can detect compressor stall. Several previous attempts to develop stall warning indicators have used either engine operating pressures or pressure ratios as input parameters. However, these systems have been unsuccessful because no dependable criteria on pressure can be established which present a reliable indication of compressor stall alone. For example, transient pressures or pressure ratios, which normally occur during safe engine operation, can provide a false indication of compressor stall. Further, these prior art attempts have required expensive aircraft modification prior to their installation.

Compressor stalls can also be evidenced by certain engine rotor speed, sonic amplitude, or gas temperature relationships. Although a tachometer provides the most positive indication of impending stall it is not sufficiently responsive, for by the time the engine speed can visibly be seen to decrease, stall has already begun and it is too late to react and prevent turbine shut down. Compressor sonic amplitude is not in itself necessarily indicative of the compressor operating condition. Variations in engine mechanical tolerance from different manufacturers and metal spurs produced by localized metal fatigue can result in widely differing sonic amplitudes and confused sonic signals.

The most practical compressor stall detection systems have employed combinations of turbine inlet temperature and compressor rotor rotational speed to detect incipient engine stall. Several systems have been proposed which utilize various combinations of the above mentioned parameters including differences, square roots, and dividends to indicate stall. However, these systems, as previously proposed, have been deficient in sensitivity and lacked ability to operate under all flight conditions.

SUMMARY OF THE INVENTION

Accordingly, the present invention provides a temperature sensor installed in the turbine inlet region of a gas turbine engine to provide a signal representative of the turbine inlet temperature (TIT), and a rotational speed sensor installed on the compressor rotor of the same gas turbine engine to produce a signal representative of the rotor speed (N). The sensor signals are coupled to a divider which continuously calculates their ratio TIT/N. The divider and the thermocouple are connected to comparators which activate a signalling device when either the value representing the ratio TIT/N or the temperature TIT exceed set thresholds and thereby the aircraft pilot is alerted to the danger of impending compressor stall.

OBJECTS OF THE INVENTION

It is therefore an object of the present invention to provide a rapid response compressor stall indicating system for a jet engine.

It is another object of the present invention to provide a gas turbine control system which allows the aircraft engine with which it is associated to approach closely its maximum performance capabilities.

it is a further object of the present invention to provide a gas turbine control system which allows the loss in acceleration due to compressor stall to be minimized.

It is yet a further object to provide a compact, lightweight, and reliable compressor stall warning system for a jet aircraft engine.

Yet another object of the present invention is to provide a stall detection system which operates effectively under all flight conditions.

Other objects and advantages will be apparent from the following specifications taken in connection with the accompanying drawings in which:

The FIGURE is a pictorial view of the invention.

DESCRIPTION OF THE PREFERRED EMBODIMENT

Referring to the FIGURE, a gas turbine engine 10 comprises a cylindrical housing 12 having a compressor 14, which may be of the axial flow type, journaled within the housing adjacent to its forward end. Compressor 14 receives air through its annular air inlet 16 and delivers compressed air to a combustion chamber 18. Within combustion chamber 18 air is burned with fuel and the resulting combustion gases are directed to the turbine rotor 28. A shaft 24 drivably connects turbine rotor 28 with compressor 14. The exhaust gases discharge rearwardly through air exhaust duct 22 whereby gas engine 10 is provided with forward propulsive thrust. The gas turbine engine structure so far described is conventional.

Thermocouple 11 is suitably disposed in the turbine inlet region to provide direct current signals (TIT) representative of the gas temperature of the turbine inlet stream. Tachometer 13 is driven directly by the engine and emits an alternating current signal. Tachometer 13 is coupled to rectifier and filter 15 which converts the input alternating current signal to a direct current signal whose voltage is representative of the engine speed (N). Divider 19 receives an output from thermocouple 11 and rectifier and filter 15 and furnishes a signal representative of the ratio TIT/N, which it calculates by operating as a conventional electronic divider.

Comparator 25 receives an output representative of TIT from thermocouple 11 and compares it with a first reference voltage. Comparator 27 receives the output of divider 19 representative of the ratio TIT/N and compares it to a second reference voltage. Comparators 25 and 27 provide output signals when, respectively, the TIT representative output from the thermocouple 11 exceeds the magnitude of the first reference voltage, or when the TIT/N representative output from divider 19 exceeds the magnitude of the second reference voltage. Comparators 27 and 25 are connected to signalling device 29, suitably located near the aircraft pilot, which provides an audible or visual signal when an output is received from either comparator.

It should be clearly understood that all the above elements comprising the system of the present invention, such as divider 19, rectifier 15 and comparators 25 and 27, are conventional in nature.

Under stall conditions, the TIT has been observed to increase while N has been observed to decrease providing an especially rapid increase in the ratio TIT/N. When this ratio increases sufficiently in magnitude the signal representing its value fed to comparator 27 by divider 19 will exceed the value of the second reference voltage and signalling device 29 will be activated. Alternatively, if TIT increases sufficiently, the signal representing its value fed to comparator 25 by thermocouple 11 will exceed the value of the first reference voltage and signalling device 29 will be activated. In either case, signalling device 29 should emit on audible sound or make a visible display warning the aircraft pilot of an impending stall.

In the case of a Pratt and Whitney TF-P-412A engine in an F14A airplane when the ratio TIT/N exceeds 16° C per radian per second the signalling device should be activated, providing a warning to the pilot of impending stall within 1-4 seconds. A TIT signal representing an excess of 1200° C should also activate signalling device 29 regardless of the N value. The value of the reference voltages may be adjusted so that the signalling device 29 may be activated when TIT/N or TIT are at different levels providing more or less sensitive responses to compressor stall conditions.

Therefore, there has been provided a more sensitive method of detecting stall conditions in the engines of jet aircraft utilizing the increase in TIT alone or in combination with the decrease in N which accompany the onset of compressor stall. The system is more accurate and effective under a broader range of flight conditions, and provides straightforward and reliable design without undue size of weight. The system allows the engine with which it is associated to approach closely its maximum performance capabilities.

Obviously, other embodiments and modifications of the present invention will readily come to those of ordinary skill in the art having the benefit of the teachings presented in the foregoing description and the drawings. It is therefore to be understood that this invention is not to be limited thereto and that said modifications and embodiments are intended to be included within the scope of the appended claims.

What is claimed and desired to be secured by Letters Patent is:

1. A stall warning system for a gas turbine engine having a compressor and turbine comprising:
   speed sensing means in communication with said compressor operably for providing a signal representative of the rotor rotational speed of said compressor;
   temperature sensing means in communication with air entering said turbine operably for providing a signal representative of the temperature of said air;
   means coupled to receive the outputs of said speed sensing means and temperature sensing means for computing the ratio of the turbine inlet temperature and the compressor rotor rotational speed, for providing output signals when either said ratio or the turbine inlet temperature exceeds prescribed thresholds; and
   signalling means coupled to receive said output signals for providing a warning signal indicative of impending aircraft engine stall.

2. A stall warning system for a gas turbine engine as recited in claim 1, wherein:
   said temperature sensing means comprises a thermocouple; and
   said speed sensing means comprises a tachometer.

3. A stall warning system for a gas turbine engine as recited in claim 1, wherein said computing means comprises:
   a rectifier connected to said speed sensing means for converting an alternating current to a direct current signal representative of the rotor speed,
   means coupled to receive the output of said rectifier and said temperature sensing means for calculating said ratio and for providing a signal representative of said ratio;
   a first comparator coupled to receive one of said temperature representative signals and compare it with a first reference voltage; and
   a second comparator coupled to receive said ratio representative signal and compare it with a second reference voltage;
   said first and second comparators providing said output signals to said signalling means.

4. A stall warning system for a gas turbine engine as recited in claim 3, wherein:
   said prescribed ratio is 16° C per radian per second.

* * * * *